United States Patent [19]

Reniers

[11] Patent Number: 5,169,366
[45] Date of Patent: Dec. 8, 1992

[54] DEVICE FOR THE REGULATION OF AN AUTOMATIC TRANSMISSION UNIT

[75] Inventor: Dirk L. Reniers, Louvain, Belgium

[73] Assignee: Volvo Car Sint-Truiden, naamloze vennootschap, St. Trond, Belgium

[21] Appl. No.: 792,401

[22] Filed: Nov. 15, 1991

[30] Foreign Application Priority Data

Nov. 22, 1990 [BE] Belgium ............................ 09001111

[51] Int. Cl.$^5$ ............................................ F16H 59/00
[52] U.S. Cl. ........................................ 474/28; 474/18; 74/869
[58] Field of Search ................ 474/8, 17, 18, 25, 28, 474/29; 74/866–869; 192/103 R, 3.3, 109 F, 3.51, 3.58, 85 R, 86

[56] References Cited

U.S. PATENT DOCUMENTS

| | | | |
|---|---|---|---|
| 4,642,069 | 2/1987 | Sawada et al. | 474/28 |
| 4,672,863 | 6/1987 | Itoh et al. | 74/868 X |
| 4,772,249 | 9/1988 | Kouno et al. | 474/28 |
| 4,778,435 | 10/1988 | Sugaya et al. | 474/28 |
| 4,784,018 | 11/1988 | Okada et al. | 474/18 X |
| 4,798,561 | 1/1989 | Hattori et al. | 474/28 |
| 4,857,034 | 8/1989 | Kouno et al. | 474/28 |
| 4,867,732 | 9/1989 | Soga et al. | 474/28 |
| 4,875,892 | 10/1989 | Sueda | 474/17 |

FOREIGN PATENT DOCUMENTS 275463 7/1988 European Pat. Off. .
289290 11/1988 European Pat. Off. .
293195 11/1988 European Pat. Off. .

Primary Examiner—Ramon S. Britts
Assistant Examiner—Robert J. Schoeppel
Attorney, Agent, or Firm—Foley & Lardner

[57] ABSTRACT

Device for the regulation of an automatic transmission unit, in particular a transmission unit composed of a torque converter, a foreward coupling, a reverse coupling and a continuously variable transmission, characterized in that this device consists of a pump; a first regulating valve for the regulation of the continuously variable transmission; a second regulating valve with which a hydraulic medium for the torque converter can be controlled; a cut-off valve; and control means which supply a regulating pressure which can provide in the control of both the cut-off valve and the second regulating valve.

19 Claims, 4 Drawing Sheets

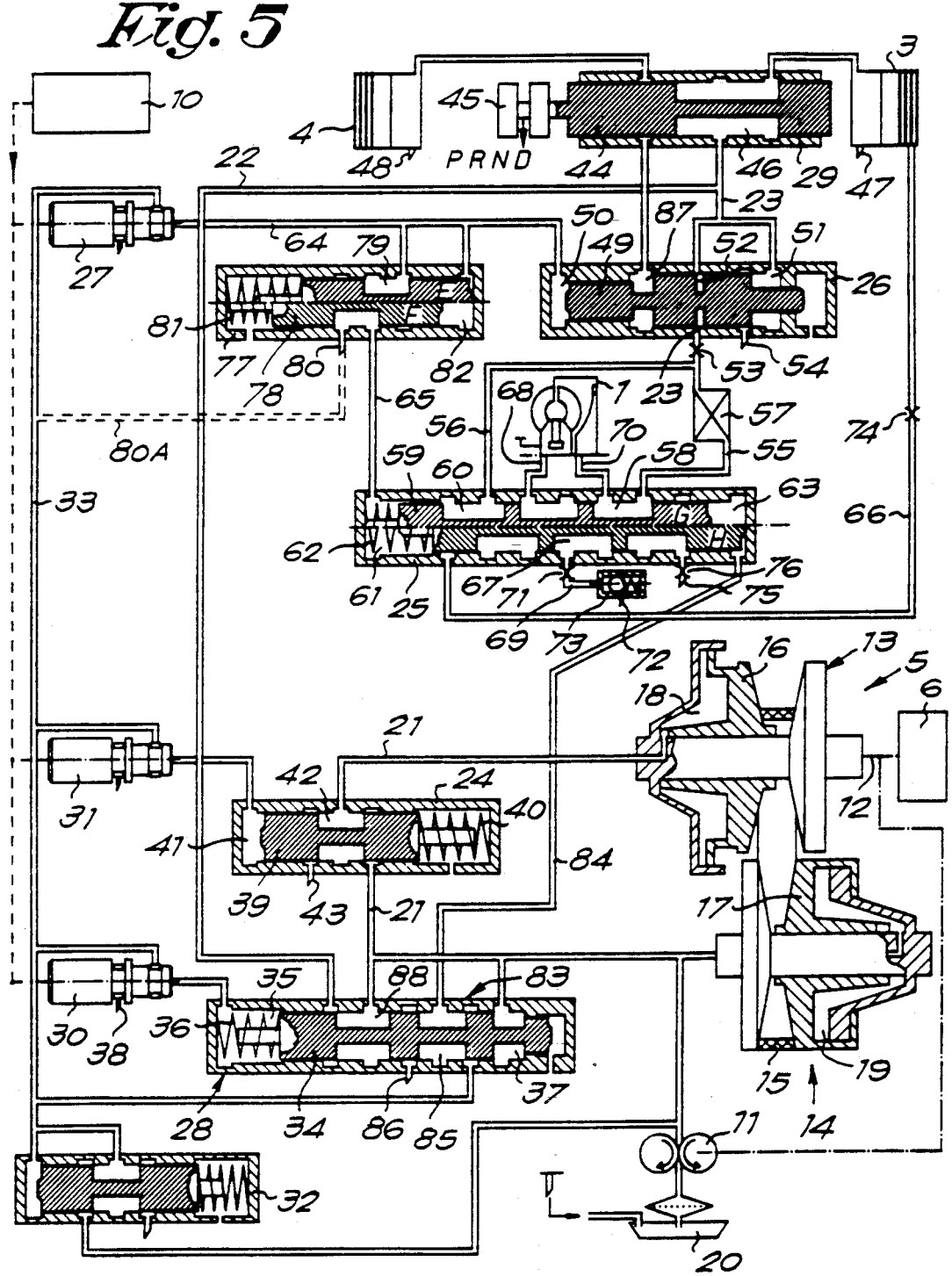

DEVICE FOR THE REGULATION OF AN AUTOMATIC TRANSMISSION UNIT

The present invention concerns a device for the regulation of an automatic transmission unit, in particular for driving motor vehicles.

It is known that transmission units for motor vehicles may consist of the succession of a torque converter, a forward coupling, a reverse coupling and a continuously variable transmission. The torque converter is hereby driven by the motor, while the continuously variable transmission drives the wheels via a differential.

The torque converter, the couplings as well as the continuously variable transmission are hereby controlled by means of hydraulic control means, which in turn are regulated by means of electronically driven control valves.

The known embodiments are disadvantageous in that in order to control the excitation level of the forward and reverse coupling, use is made of an extra control valve.

In order to always provide both the couplings and the torque converter with a sufficient amount of hydraulic medium use is made in the known inventions of either two pumps, one big pump or a controllable pump. The use of two pumps raises the cost price of the device considerably. The use of one big pump results in an excessive delivery being created at high speeds, which is disadvantageous in that the output decreases as a result of the hydraulic losses. A solution to this problem might consist in controlling the delivery of the pump via the drive of this pump. However, such a solution is very expensive.

The present invention concerns a device for the regulation of an automatic transmission unit in motor vehicles which does not have said disadvantages, in other words, in which the hydraulic regulation is set by means of only one normally sized pump and in which the locking of the torque converter and the excitation level of the couplings is controlled by means of a common control valve.

The device according to the invention makes it possible to let both the wet lamination coupling and the torque converter slip when taking off, to lock the wet lamination coupling while the torque converter slips, to lock the torque converter when the wet lamination coupling is locked and to modulate the coupling pressure in case of half throttle while the torque converter remains locked. If the control valve fails, the wet lamination coupling is locked whereas the torque converter either remains open all the time or is open in the lowest gear and locked in all other transmission ratios. Moreover, in case of an insufficient pump delivery, the coupling pressure in the forward coupling, reverse coupling respectively, still retains its value by reducing the delivery that goes to the torque converter.

To this aim, the invention concerns a device for the regulation of an automatic transmission unit, in particular a transmission unit composed of a torque converter, a forward coupling, a reverse coupling and a continuously variable transmission, characterized in that this device mainly consists in the combination of a pump providing a hydraulic medium; supply pipes to the regulating cylinder of the continuously variable transmission, the couplings and the torque converter respectively, whereby the supply pipe to the torque converter is connected to the supply pipe to the couplings; a first regulating valve placed in the supply pipe to the regulating cylinder of the continuously variable transmission for the regulation of the continuously variable transmission; a second regulating valve connected to the supply pipe to the torque converter by means of which the hydraulic medium can be sent in one or the other direction through the torque converter, whereby the medium—in the position taken by the regulating valve when the pressure in the supply pipe to the couplings is low—is sent through the torque converter in such a way that this is opened; a cut-off valve placed upstream with regard to the second regulating valve in the supply pipe to the torque converter; and control means which supply a regulating pressure which provides for both the control of the cut-off valve and the second regulating valve, whereby the cut-off valve sets a particular ratio between the pressure in the supply pipe to the couplings and the regulating pressure provided by the control means, while, at least in the normal working area, the second regulating valve starts to move as soon as the regulating pressure reaches a certain level.

In a preferred embodiment the device according to the invention also has means which, when the control means fail, guide the control of the second regulating valve as a function of the primary pressure of the continuously variable transmission, in other words the pressure in the regulating cylinder of the transmission, or as a function of another pressure, one and other such that one is still able to drive the vehicle.

According to yet another particular embodiment the device according to the invention also has means with which the torque converter can be permanently engaged, while the pressure in the couplings can be reduced so as to obtain a better output while driving.

In order to better explain the characteristics according to the invention, by way of example only and without being limitative in any way, the following preferred embodiment is described with reference to the accompanying drawings, where:

FIG. 5 shows a variant of the device according to the invention.

Figure 1:
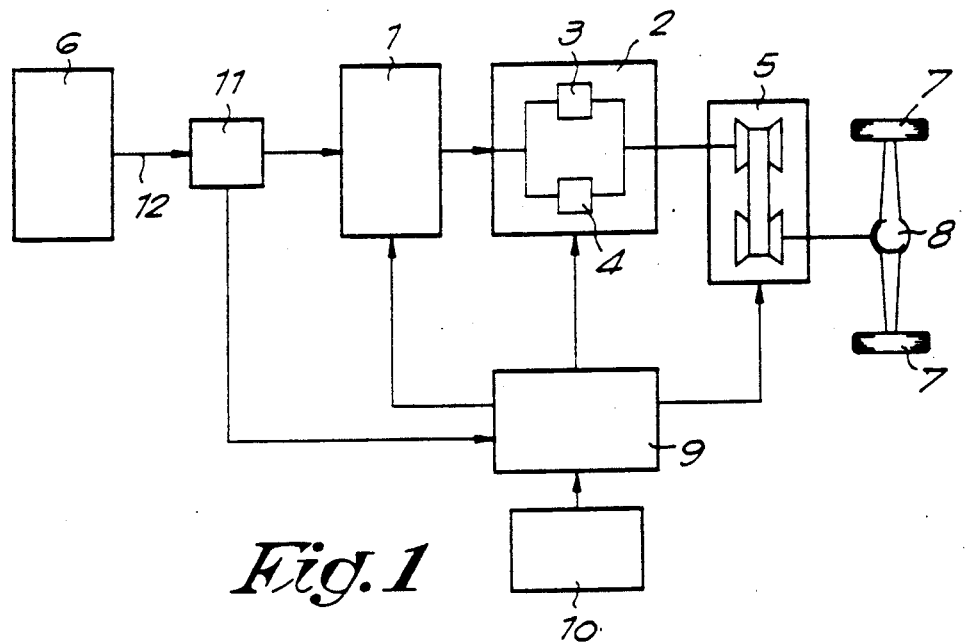
FIG. 1 shows the device according to the invention in a block diagram.

As shown in FIG. 1 an automatic transmission unit may consist as is known of a torque converter 1, coupling means 2 made up of a forward coupling 3 and a reverse coupling 4, and a continuously variable transmission 5. In motor vehicles, the torque converter 1 is driven by the engine 6, while the continuously variable transmission 5 drives the wheels 7 via for example a differential 8. The whole is controlled by means of a hydraulic regulating valve 9 which is controlled by means of a control unit 10, which emits signals as a function of various parameters and measurements such as the position of the accelerator pedal, the engine speed, the slip in the torque converter 1, etc. The hydraulic regulating unit 9 is fed with a hydraulic medium, such as oil or another suitable fluid, by means of a pump 11, which is driven by the motor shaft 12.

Figure 2:
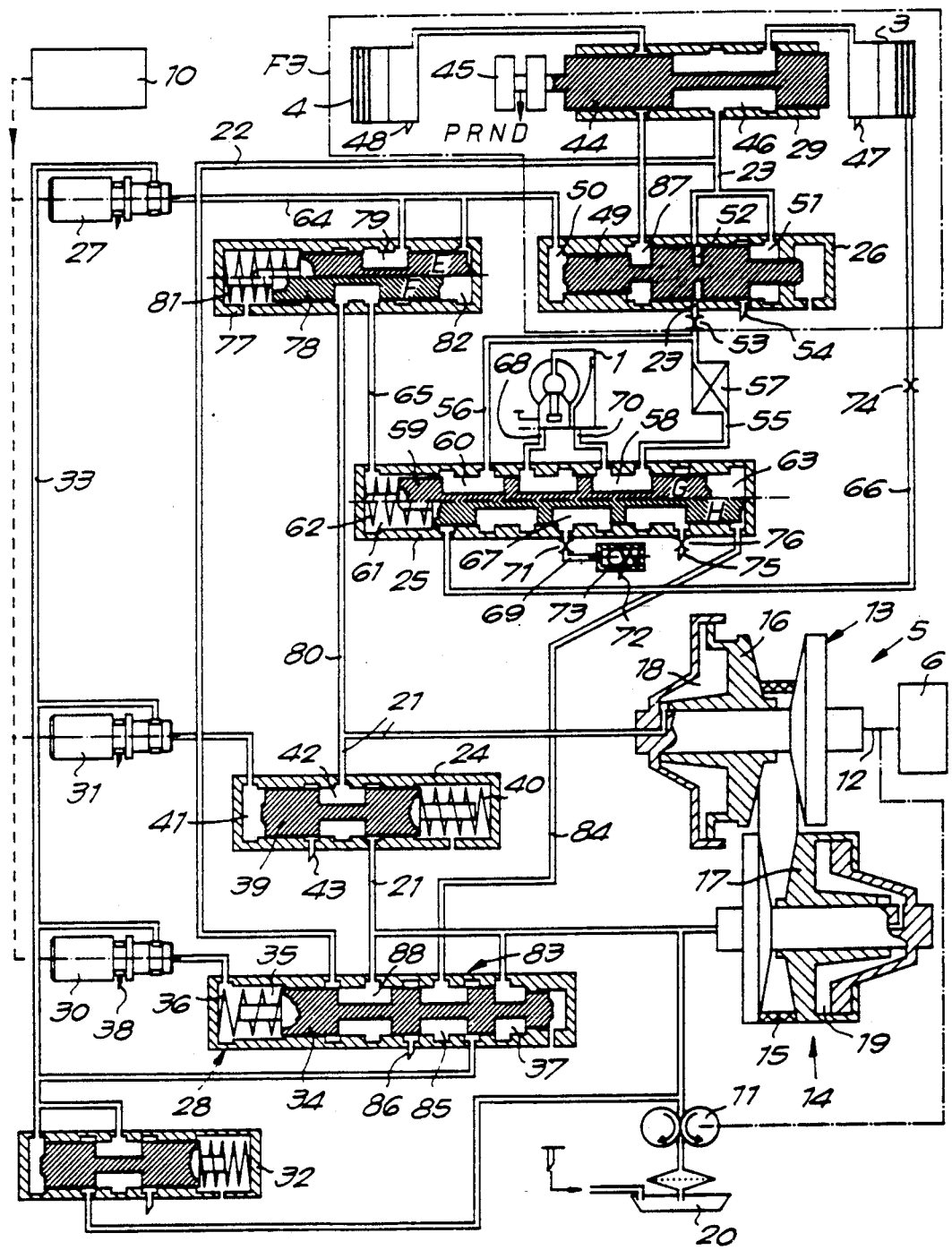
FIG. 2 shows a practical embodiment of a device according to the invention.

As shown in FIG. 2 the couplings 3 and 4 consist of wet laminated couplings, which as is known can be locked by providing a hydraulic medium under sufficient pressure.

The continuously variable transmission 5 consists of two V-shaped pulleys 13 and 14 in between which a transmission belt 15 has been applied. The pulleys 13 and 14 each have a pulley half 16 and 17 which can be axially moved by means of hydraulic cylinders 18 and 19, whereby the effective diameter of the primary cylinder 18 is bigger than that of the secondary cylinder 19, so that the cylinder 18 functions as a regulating cylinder.

The composition of the torque converter 1 is sufficiently known and therefore is not described hereafter. Its working is based on the fact that when the hydraulic medium is sent through it in one direction, the torque converter forms a closed coupling, while when the hydraulic medium is sent through it in the other direction, the torque converter provides in a slipping coupling whereby the ingoing tourque is increased.

According to the present invention the device for regulating the transmission unit consists in the combination of the above-mentioned pump 11 which supplies the hydraulic medium, in particular pumps up this medium from a reservoir 20; supply pipes 21, 22 and 23 to the regulating cylinder 18 of the continuously variable transmission 5, to the couplings 3 and 4 and to the torque converter 1 respectively, whereby the supply pipe 23 to the torque converter 1 is connected to the supply pipe 22 to the couplings 3 and 4; a first regulating valve 24 placed in the supply pipe 21 to the continuously variable transmission 5 for the regulation of this transmission 5; a second regulating valve 25 connected to the supply pipe 23 to the torque converter 1 by means of which the hydraulic medium can be sent in one or the other direction through the torque converter 1; a cut-off valve 26 placed upstream with regard to the second regulating valve 25 in the supply pipe 23; and control means, which in preference consist of a control valve or servo valve 27, which supply a regulating pressure which can provide for the control of both the cut-off valve 26 and the second regulating valve 25. Hereby the second regulating valve 25 is made such that the hydraulic medium—in the position taken by said regulating valve when the pressure in the supply pipe 22 to the couplings 3 and 4 is low—is sent through the torque converter 1 in such a way that this is opened.

Further, various parts are shown in FIG. 2 such as a second cut-off valve 28 to which the supply pipe 22 is connected; a switch valve 29 to control the couplings 3 or 4; control means such as control valves 30 and 31 which command the second cut-off valve 28 and the first regulating valve 24; and a pressure regulating valve 32 which sets a constant pressure in the supply pipe 33 of the control valves 27, 30 and 31.

The second cut-off valve 28 adjusts the pressure in the cylinder 19 which is directly connected to the outlet of the pump 11. This cut-off valve 28 is of such nature that the fluid pressure of a room 35 and the force of a spring 36 applied in it on the one hand, and the fluid pressure in a second room 37, equal to the fluid pressure in the cylinder 19, on the other hand act on the valve body 34. The outlet of the second cut-off valve 28 is connected to the supply pipe 22. The pressure in the room 35 is adjusted by the control valve 30. This control valve 30 regulates the pressure in the room 35 either by supplying fluid via the supply pipe 33 or by carrying off fluid via a discharge pipe 38.

The first regulating valve 24 regulates the transmission ratio of the continuously variable transmission 5. To this end said valve is provided with a valve body 39 which is loaded by a spring 40 on the one hand and by the fluid pressure in a room 41 on the other hand. The pressure in this room 41 is regulated by means of a control valve 31. By varying this pressure the regulating valve 24 either supplies fluid to the cylinder 18 via a port 42 or carries off fluid from this cylinder 18 to a discharge pipe 43.

If the pressure in the room 41 is low, the cylinder 18 is connected to the discharge pipe 43 as a result of which a small radius is obtained on the primary pulley. If the pressure in the room 41 exceeds a certain value, the port 42 will connect the cylinder 18 to the pressure side of the pump 11. Since the effective diameter of the cylinder 18 is bigger than that of the cylinder 19, the radius around the primary pulley 13 will increase in this case, whereas the radius around the secondary pulley 14 decreases.

The above-mentioned switch valve 29 has a valve body 44 which is connected to the gear lever 45 of the vehicle. The gear lever 45 offers four possible positions: "Park", "Reverse", "Neutral" and "Drive", indicated respectively by P, R, N and D. In the position D the forward coupling 3 will be engaged, and in the position R the reverse coupling 4.

To this end, the valve body 44 has a port 46, such that in the position D the fluid is led from the supply pipe 22 to the foreward coupling 3 and in the position R to the reverse coupling 4. While any of the couplings 3 or 4 is excited, the fluid pressure in the other coupling is left out through small openings 47 or 48.

The cut-off valve 26 regulates the pressure in the supply pipe 22. This cut-off valve 26 is made such that its valve body 49 is loaded on the one hand by the pressure in a room 50 set by the control valve 27, and on the other hand by the pressure in a room 51 which is permanently connected to the supply pipe 22. A port formed by a groove 52 has been provided in the valve body 49 with which, depending on the position of the valve body 49 the supply pipe 23 is more or less disconnected.

If the delivery of the pump 11 is sufficient, the fluid can be carried off from the supply pipe 22 through the groove 52, and this through a narrowing 53 in the supply pipe 23, downstream in relation to the cut-off valve 26. The excessive delivery is carried off in this case via the room 51 and the discharge pipe 54.

After the narrowing 53 the supply pipe 23 splits up in a pipe 55 and a pipe 56. The pipe 55 runs via a cooler 57 and then to a port 58 in the valve body 59 of the second regulating valve 25. The above-mentioned second pipe 56 goes to a port 60, also in the valve body 59.

In the embodiment shown the second regulating valve 25 has a valve body 59 upon which the fluid pressure in a room 61 and a spring 62 act on one side, while the fluid pressure from a room 63 act on it on the other side. The pressure in the room 61 is adjusted by means of the control valve 27, and this via pipes 64 and 65.

If the pressure in the room 61 is low and the pressure in room 63 is high, the valve body 59 will be in the indicated position G and the port 60 will connect the pipe 56 to a pipe 66, a port 67 will connect the outlet 68 of the torque converter 1 to a pipe 69 and the port 58 will connect the pipe 55 to the outlet 70 of the torque converter 1. The fluid from the supply pipe 23 is then carried through the cooler 57 to the inlet 70 of the torque converter 1 such that the latter can slip. The fluid coming out of the outlet 68 runs through a narrowing 71 in the pipe 69 and is carried off via a discharge pipe 72 with a non-return valve 73. The fluid also flows away via the pipe 56, through the port 60 and the pipe 66, via a narrowing 74 to the forward coupling 3 so as to cool off the latter.

If the pressure in the room 61 exceeds a certain value, the valve body 59 shifts into position H such that the port 60 connects the pipe 56 to the outlet 68 of the torque converter 1, the port 67 connects the inlet 70 of the torque converter 1 to the pipe 69 and the port 58 connects the pipe 55 to a discharge pipe 75 in which a narrowing 76 has been provided. The fluid from pipe 56 is then led to the outlet 68 of the torque converter 1, as a result of which this torque converter 1 is locked, and the slipping stops. The fluid which then comes out of the inlet 70 is carried off via the narrowing 71, the pipe 69 and the non-return valve 73. The fluid which runs through the cooler 57 is then carried off via the discharge pipe 75.

In a preferred embodiment the device also has means which, when the control means fail, in this case when the control valve 27 fails, interrupt the pipe 64 of said control means to the second regulating valve 25 and provide a pressure at the pressure regulating inlet of said regulating valve 25 such that the torque converter 1 either remains open all the time or is open in the lowest gear and locked in all other transmission ratios. It is clear that this can be realized in various ways.

According to the embodiment in FIG. 2 the pressure regulating inlet of the regulating valve 25 is connected to this end on the primary pressure of the continuously variable transmission 5. In the embodiment shown the means used to this end consist of a switch valve 77 whose valve body 78 has a port 79 which either connects the pipe 64 to the pipe 65, or connects this pipe 65 to the above-mentioned supply pipe 21, in particular to the regulating cylinder 18, and this via a pipe 80. As a long as the pressure in pipe 64 does not exceed a certain value, the valve body 78 stands in position E, whereby the pipes 64 and 65 are connected.

As soon as the pressure in pipe 64 exceeds a certain value, as a result of the equilibrium that is brought about between the force of the spring 81 and the pressure in the room 82, the valve body 78 is moved into the indicated position F. The latter happens when the pressure in the pipe 64 is almost equal to the pressure in the feed pipe 33. Hereby, as mentioned above, the pipes 65 and 80 are connected to one another.

Thus it is clear that the tension of the spring 81 is selected such that the port 79 makes a connection between the second regulating valve 25 and the outlet of the control valve 27 as long as the pressure at the outlet of the control valve 27 differs from the pressure that is set by the control valve 27 when the electronics driving said control valve 27 fail.

According to a special embodiment the device also has means with which the torque converter 1 can be permanently switched on, such that the coupling pressure can be reduced while driving so as to obtain a better output, and this by limiting the hydraulic pressure losses. In the embodiment shown these means consist of a valve 83 which is made in one piece with the second cut-off valve 28 and which is driven by means of the control valve 30, and of a pipe 84 which connects this valve 83 to the above-mentioned room 63 of the second regulating valve 25.

Also, the valve body 34 has a port 85, one and other such that by moving this valve body the room 63 is either connected to the feed pipe 33 or to the discharge pipe 86. It is clear that the valve body 59 in the latter case always takes the position H whereby the torque converter 1 is locked.

Figure 3:
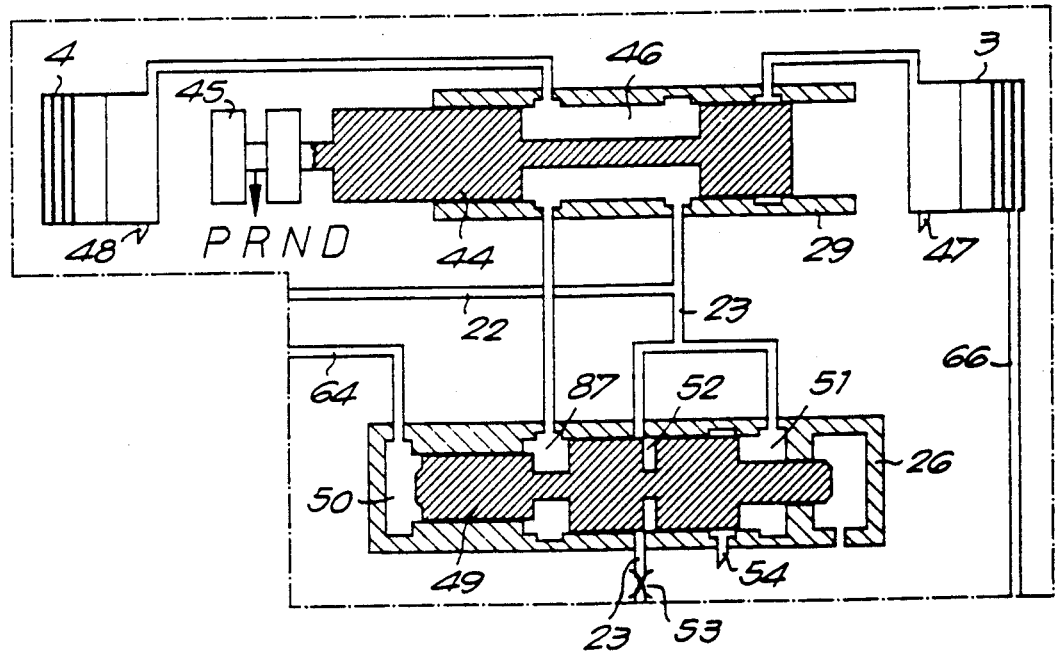
FIG. 3 shows the part indicated in FIG. 2 by F3 in another position.
Figure 4:
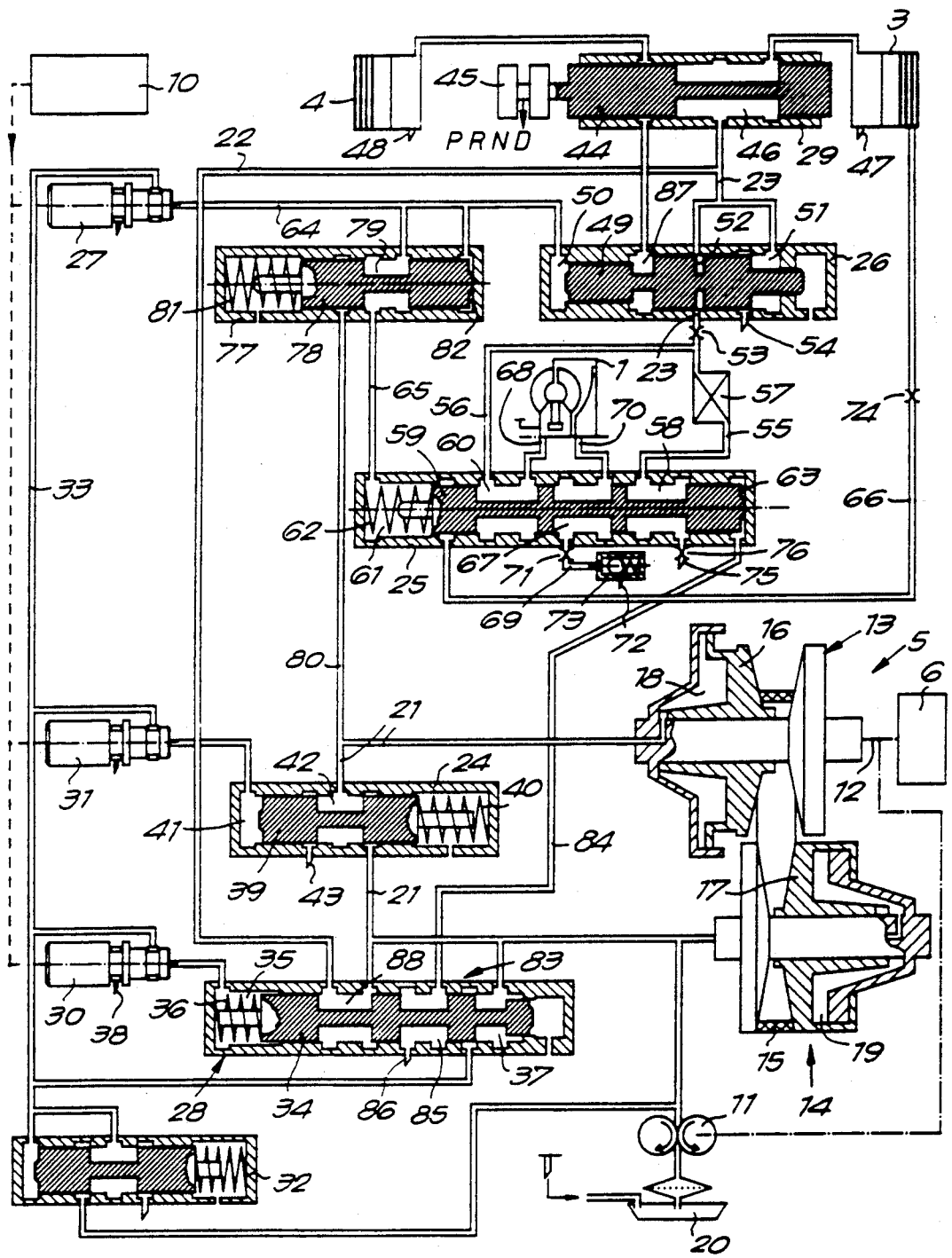
FIG. 4 shows the device in FIG. 2 in another position.

The working of the device is described hereafter with reference to the various positions shown in FIGS. 2, 3 and 4.

After the engine 6 has been started, while the gear lever 45 is in position N or P, the pressure in the pipe 64 is minimal. When, as indicated in FIG. 2, the gear lever is put in position D, the control valve 27 is driven such by the control unit 10 that the pressure in the pipe 64 gradually increases. This results in an increase of the pressure in the room 50, as a result of which the pressure in the room 51 also increases, such that also the pressure in the supply pipe 22 increases. In this way, the forward coupling is locked gradually and smoothly.

The speed with which the pressure in the pipe 64 is altered and the magnitude of this pressure is as a function of the gas valve position and the brake signal. It is clear that these data can be measured in an appropriate way and transmitted to the control unit 10. Hereby, some slip in the forward coupling 3 is allowed so as to let the engaging of the coupling go smoothly, so as to avoid the vibration of the vehicle when standing still in "Drive" and braking and so as to reduce the creep speed. The valve body 59 is hereby put in the position G such that the torque converter 1 is opened and that the fluid running through the torque converter 1 is cooled off by the cooler 57.

When the accelerator pedal is stepped on, the control valve 27 is driven such that the pressure in the pipe 64 slowly increases such that the forward coupling 3 is locked with certainty. The valve body 59 of the second regulating valve 25 is hereby still in the position G.

It should be noted that the switch valve 77 is permanently in the position E in the normal working area.

If the slip of the torque converter 1 drops under a certain value, the control valve 27 is driven such that the pressure in the pipe 64 further increases, independently of the gas valve position, such that the valve body 59 is put in the position H and fluid is pumped through the torque converter 1 such that the latter is locked. The slip in the torque converter 1 is hereby measured by means of an appropriate measuring device, whose output signal is transmitted to the control unit 10. It is clear that also the position of the accelerator pedal, the gas valve respectively, is detected in an appropriate way and transmitted to the control unit 10.

During all this the cut-off valve 26 regulates the pressure in the supply pipe 22. In the position D of the switch valve 29 the port 87 of the cut-off valve 26 is pressureless. At one side of this valve body 49 only the pressure in the room 50 acts and on the other side the pressure in the room 51. As long as the delivery of the pump 11 is sufficient, the fluid in the pipe 22 can go to the pipes 55 and 56. However, if the delivery of the pump is insufficient, the pressure drop is decreased over the narrowing 53, such that the pressure decreases upstream of this narrowing 53. Since the pressure in the room 50 does not drop, an imbalance is brought about in the cut-off valve 26, such that the valve body 49 slides to the right. As a result the discharge pipe 54 is closed off and the groove 52 forms an intersection with the supply pipe 23, such that the pressure in the supply pipe 22 and the room 51 rises again to the desired level, whereas the pressure in the part of the supply pipe 23 between the cut-off valve 26 and the narrowing 53 retains its lower value.

It is clear that thanks to the use of the cut-off valve 26, there is always enough pressure to lock the couplings 3 or 4, while the control of these couplings 3 and 4 and the control of the torque converter 1 is effectuated with only one extra control valve 27.

FIG. 3 shows the situation when the gear lever 45 is put in the position R, when reversing. The port 87 is filled in this case with the same fluid pressure as in the room 51. This pressure exercises a force on the valve body 49 in the same direction as the pressure in the room 50, as a result of which the pressure in the room 51, in the supply pipe 22 and in the reverse coupling 4 increases. This offers the advantage that the reverse coupling 4 is pressed on with more force than is the case for the forward coupling 3, as a result of which this can transmit a larger torque.

In the embodiment shown in FIG. 2 the pressure in the pipe 64 becomes equal to the pressure in the feed pipe 33 when the electronics driving the control valve 27 fail. As a result the valve body 78 of the switch valve 77 moves into the position F, such that the pressure in the room 61 varies with the pressure in the regulating cylinder 18. This has for a result that when the transmission ratio of the continuously various transmission 5 is low, slip may occur in the torque converter 1, whereas the latter is locked in case of a bigger transmission ratio, such that even when the control valve 27 fails, it is still possible to drive the vehicle.

FIG. 4 shows the situation in the case where the pressure in the foreward coupling 3 is reduced. This can be done when the vehicle is driving at a certain transmission ratio so as to obtain a better hydraulic output. To this end, the control valve 30 is driven such that the pressure in the room 35 decreases, thus also decreasing the pressure in pipe 21 until the pressures in room 88 and pipe 22 are equal. If the pressure in the room 35 is decreased, the valve body 34 of the second cut-off valve 28 takes a position as shown in the figure. Hereby, the room 63 of the second regulating valve 25 is connected via the port 85 to the discharge pipe 86, as a result of which the valve body 59 is put in the position H. This makes it possible for the pressure in the pipe 64, and thus also in the supply pipe 22 and in the forward coupling 3 to be altered at random without therefore changing the position of the valve body 59. Also when the pressure is decreased, the torque converter 1 remains locked.

The second cut-off valve 28 has a port 88, one and other such that an entirely free passage is formed between the pump 11 and the supply pipe 22 at the time when the port 85 connects the pipe 84 to the discharge pipe 86.

It is obvious that the invention can also be realized in other embodiments and that it does not depend on the type of control means. Thus the invention can also be realized with the pressure at the outlet 64 of the control valve 27 becoming nil when the electronics driving this control valve fail.

FIG. 5 shows a variant in which the above-mentioned pipe 80 is made as a discharge pipe which, just as the other discharge pipes, is connected to the above-mentioned reservoir 20 instead of to the pipe 21. This has for a result that the torque converter 1, when the control valve 27 fails, whereby the switch valve 77 takes the position F, always remains open. In this case also, when the control valve 27 fails, it is still possible to drive the vehicle.

According to yet another variant the pressure regulating inlet of the second regulating valve 25 is connected to the feed pipe 33 when the control valve 27 fails, as indicated by the dotted line in FIG. 5 with the pipe 80A.

The present invention is in no way limited to the embodiment described by way of example and shown in the accompanying drawings; on the contrary, such a device for the regulation of an automatic transmission unit can be made in all sorts of variants while still remaining within the scope of the invention.

I claim:

1. A device for the regulation of an automatic transmission unit, in particular a transmission unit composed of a torque converter (1), a foreward coupling (3), a reverse coupling (4) and a continuously variable transmission (5), characterized in that this device comprises the combination of a pump (11) providing a hydraulic medium; supply pipes (21, 22, 23) to a regulating cylinder (18) of the continuously variable transmission (5), to the couplings (3, 4) and to the torque converter (1), respectively, whereby the supply pipe (23) to the torque converter (1) is connected to the supply pipe (22) to the couplings (3, 4); a first regulating valve (24) placed in the supply pipe (21) to the regulating cylinder (18) of the continuously variable transmission (5) for the regulation of the continuously variable transmission (5); a second regulating valve (25) connected to the supply pipe (23) to the torque converter (1) by means of which the hydraulic medium can be sent in one or the other direction through the torque converter (1), whereby the medium, in the position taken by the second regulating valve (25) when the pressure in the supply pipe (22) to the couplings (3, 4) is low, is sent through the torque converter (1) in such a way that torque converter (1) is opened; a cut-off valve (26) placed upstream with regard to the second regulating valve (25) in the supply pipe (23) to the torque converter (1); and control means which supply a regulating pressure which provides for the control of both the cut-off valve (26) and the second regulating valve (25), whereby the cut-off valve (26) sets a particular ratio between the pressure in the supply pipe (22) to the couplings (3, 4) and the regulating pressure provided by the control means, while, at least in the normal working area, the second regulating valve (25) starts to move as soon as the regulating pressure reaches a predetermined level.

2. A device according to claim 1, characterized in that the above-mentioned control means comprises a control valve (27) driven by a control unit (10) with which the displacement of the valve body (59) of the second regulating valve (25) and the pressure in the supply pipe (22) to the couplings (3, 4) can be adjusted.

3. A device according to claim 2, characterized in that the cut-off valve (26) has a valve body (49) which is loaded on the one hand by a pressure in a room (50) connected to the control valve (27) and on the other hand by the pressure in a room (51) connected to the supply pipe (22) to the couplings (3, 4).

4. A device according to claim 2 characterized in that the valve body (49) of the cut-off valve (26) is provided with a port (52) with which the supply pipe (23) to the torque converter (1) can be closed off to a greater or lesser extent.

5. A device according to claim 2 characterized in that a narrowing (53) has been provided in the supply pipe

(23) to the torque converter (1) downstream of the cut-off valve (26).

6. A device according to claim 2 characterized in that the cut-off valve (26) has a port (87) with which, when a medium is supplied under pressure, a force is exerted on the valve body (49) which counteracts the pressure in a room (51) connected to the supply pipe (23) to the couplings (3, 4), whereby the device has a switch valve (29) whose valve body (44) is connected to the gear lever (45) and in which a port (46) has been applied which connects the above-mentioned port (87) in the cut-off valve (26) to the supply pipe (22) to the couplings (3, 4).

7. A device according to claim 1, characterized in that the supply pipe (23) to the torque converter (1) splits up, downstream to the port (52) in the valve body of the cut-off valve (26), in at least two pipes (55, 56) connected to the second regulating valve (25) and in that this second regulating valve (25) has a number of ports (58, 60, 67), such that in a first position (G) of this regulating valve (25) part of the hydraulic medium is pumped such through the torque converter (1) that the latter can slip and this medium is carried off via a discharge pipe (72), whereby the rest of this medium provides in the cooling of the foreward coupling (3) via a pipe (66); in a second position (H) part of the hydraulic medium is pumped such through the torque converter (1) that this is locked, and the rest of the medium is carried off.

8. A device according to claim 7, characterized in that it is provided with a cooler (57) which on the one hand cools off the medium which during the slipping of the torque converter (1) flows through the latter, and which on the other hand cools off the excess medium when the torque converter (1) is locked.

9. A device according to claim 1, characterized in that it has means which, when the control means of the second regulating valve (25) fail, let the control of said control valve (25) happen as a function of the primary pressure of the continuously variable transmission (5).

10. A device according to claim 9 whereby the control means of the second regulating valve (25) comprises a control valve (27) which provides in the control of the second regulating valve (25) by means of a control pressure, characterized in that the device has means which, when said control means fail, interrupt the pipe (64) of these control means to the second regulating valve (25) and connect the pressure regulating inlet of the second regulating valve (25) to the regulating cylinder (18) of the continuously variable transmission (5).

11. A device according to claim 10, characterized in that the above-mentioned means comprises a switch valve (77) whose valve body (78) has a port (79) which depending on the position (E, F) of this valve body (78) connects either the outlet of the control valve (27) or the regulating cylinder (18) of the continuously variable transmission (5) to the pressure regulating inlet of the second regulating valve (25).

12. A device according to claim 1, characterized in that it has means which, when the control means of the second regulating valve (25) fail, put this regulating valve (25) in a fixed position so that at least part of the hydraulic medium is sent in such a way through the torque converter (1) that the latter can slip.

13. A device according to claim 12 whereby the control means of the second regulating valve (25) comprises a control valve (27) which provides in the control of the second regulating valve (25) by means of a controlled pressure, characterized in that the device has means which, when said control means fail, interrupt the pipe (64) of these control means to the second regulating valve (25) and connect the pressure regulating inlet of the second regulating valve (25) to a pipe (80) in which there is a constant pressure.

14. A device according to claim 13, characterized in that the above-mentioned means comprises a switch valve (77) whose valve body (78) has a port (79) which depending of the position (E, F) of this valve body (78) connects either the outlet of the control valve (27) or the pipe (80) under constant pressure to the pressure regulating inlet of the second regulating valve (25).

15. A device according to claim 11 characterized in that the valve body (78) of the switch valve (77) is loaded on the one hand by the pressure in a room (82) connected to the outlet of the regulating valve (27), and is loaded on the other hand by a spring (81) whereby the spring tension is selected such that the port (79) makes a connection between the second regulating valve (25) and the outlet of the control valve (27) as long as the pressure at the outlet of the control valve (27) differs from the pressure set by the control valve (27) when the electronics driving the control valve (27) fail.

16. A device according to claim 1 characterized in that it has means with which the torque converter (1) can be permanently switched on.

17. A device according to claim 16, characterized in that the above-mentioned means comprises a room (63) in the second regulating valve (25), such that the valve body (59) of the second regulating valve, after the pressure has been taken out of this room (63) stands in the position (H) whereby the torque converter (1) is closed; a valve (83) whose valve body (34) has a port (85) which either connects said room (63) to a supply pipe (33) for a medium under constant pressure, or connects said room to a discharge pipe (86); and control means to move the valve body (34) of the valve (83).

18. A device according to claim 17, characterized in that the valve body of the above-mentioned valve (83) is made in one piece with the valve body of a second cut-off valve (28) whose inlet is connected to the pump (11) and to the secondary cylinder (19) of the continuously variable transmission (5) and whose outlet is connected to the supply pipe (22) to the couplings (3, 4) whereby this valve body (34) has a port (88) which forms an entirely free passage of the pump (11) to said supply pipe (22) in the position where the second port (85) connects the above-mentioned room (63) of the second regulating valve (25) to the discharge pipe (86).

19. A device according to claim 17 characterized in that the control means to move the valve body (34) of the above-mentioned valve (83) comprises a control valve (30) which under normal working conditions regulates the pressure in the cylinder (19) of the secondary pulley and a control valve (27) which regulates the pressure in the supply pipe (22).

* * * * *